United States Patent [19]

Noborimoto et al.

[11] 4,449,213
[45] May 15, 1984

[54] OPTICAL READING APPARATUS

[75] Inventors: Kazutaka Noborimoto, Tokyo; Keiji Maruta; Junichi Suzuki, both of Kanagawa; Kenji Shintani, Tokyo, all of Japan

[73] Assignee: Sony Corporation, Tokyo, Japan

[21] Appl. No.: 330,875

[22] Filed: Dec. 15, 1981

[30] Foreign Application Priority Data

Dec. 18, 1980 [JP] Japan ................................ 55-179891

[51] Int. Cl.³ .............................................. G11B 7/08
[52] U.S. Cl. ....................................... 369/45; 369/44; 350/484
[58] Field of Search ...................... 369/44, 45, 46, 122; 350/6.3, 245, 247, 255, 484, 486

[56] References Cited

U.S. PATENT DOCUMENTS

| 4,092,529 | 5/1978 | Aihara et al. | |
| 4,135,083 | 1/1979 | Van Alem et al. | |
| 4,135,206 | 1/1979 | Kleuters et al. | |
| 4,193,091 | 3/1980 | Kleuters et al. | 369/45 |
| 4,302,830 | 11/1981 | Hamaoka et al. | 369/45 |
| 4,385,373 | 5/1983 | Howe | 369/45 |

Primary Examiner—Donald E. McElheny, Jr.
Attorney, Agent, or Firm—Lewis H. Eslinger; Alvin Sinderbrand

[57] ABSTRACT

A device for supporting and positioning the objective lens in an optical reading apparatus, such as, a video disc player, comprises a first pair of parallel leaf springs attached at one end thereof to a fixed support member for motion parallel to a record medium surface. A movable frame is attached to the other ends of the first springs, and a second pair of leaf springs movable perpendicularly to the record medium surface extend from the frame, the second springs being generally parallel to and between the first pair but with their faces perpendicular to those of the first pair. The objective lens is mounted at the free ends of the second pair of springs, and is movable electromagnetically in orthogonally related directions by means of coils and magnets associated with the objective lens and with the frame.

6 Claims, 4 Drawing Figures

OPTICAL READING APPARATUS

BACKGROUND OF THE INVENTION

1. Field of the Invention

The present invention relates generally to optical reading apparatus, and more particularly is directed to a device for supporting an objective lens in apparatus for optically reading an audio or video signal or the like recorded in a track on a record medium.

2. Description of the Prior Art

In a prior art optical reading apparatus shown on FIG. 1, an optical record medium surface 1 has an information signal, such as, an FM-modulated video signal or a PCM audio signal or the like recorded thereon as a pit array in a spiral track or in a series of concentric circular tracks. A laser light souce 2 emits a laser beam LB, which is reflected by a mirror 3a of a tracking mirror assembly 3 onto the record medium 1. The beam passes from mirror 3a through an objective lens 5, which is part of a focusing assembly 4. If the laser light source is a semiconductor device, the laser beam reflected from the record medium 1 may be returned along the illustrated path directly to the laser light source 2. If the laser light source 2 is of another type, such as, a gas laser, a beam splitter (not shown) is provided to direct the reflected laser beam to a photoelectric transducer (not shown). In either case, the laser beam reflected from the surface 1 of the record medium is modulated with the information recorded thereon.

The mirror 3a of tracking mirror assembly 3 is seen to be mounted, at the center of its back surface, by a rubber or other flexible member 6 to a fixed support 7. Magnets 8 are attached to the back surface of mirror 3a at opposed locations, and fixed coils 9 are disposed in juxtaposed relation to magnets 8. A tracking error signal is supplied to the fixed coils 9 which electromagnetically cooperate with magnets 8 to angularly displace mirror 3a relative to its fixed support 7 for causing the laser beam LB to accurately scan the track in which the information signal is recorded.

The focusing assembly 4 of the apparatus of FIG. 1 includes an electromagnetic device known as a linear motor. As shown, the objective lens 5 is attached to a cylindrical bobbin 10 on which is wound a coil 11, with bobbin 10, lens 5, and coil 11 forming a moving member 12. A cylindrical guide member 12a depends from bobbin 10 about the periphery of lens 5 for mechanically locating moving member 12 relative to a magnetic yoke 14 which includes an annular bottom portion and inner and outer cylindrical portions inside and outside bobbin 10. A bearing 16 is carried by the inner cylindrical portion of yoke 14 for guiding cylindrical guide member 12a. Included in the outer cylindrical portion of yoke 14 is an annular magnet 13. The magnet 13 and yoke 14 together form a fixed member 15, and moving member 12 and fixed member 15 together form the linear motor of focusing assembly 4. A focusing error signal is suitably supplied to coil 11, for electromagnetically moving moving member 12 vertically with respect to fixed member 15 in the direction to restore the correct focusing of laser beam LB at surface 1.

The above prior art optical reading apparatus has at least one substantial drawback. Angular displacement of tracking mirror 3a changes the angle between laser beam LB and the optical axis of lens 5. If it is desired to provide an objective lens 5 which is free from aberration as a result of this change of angle, the number of lenses that are required to form objective lens 5 must be increased to correspondingly increase its cost.

A further drawback is that the rubber connecting member 6 of tracking assembly 3 deteriorates with time and, in particular, begins to have hysteresis characteristics, which impair the accuracy of tracking. In addition, providing a tracking assembly 3 separate from the focusing assembly 4 increases the size and difficulty of installation of the optical reading apparatus.

Another example of a prior art optical reading apparatus is disclosed in U.S. Pat. No. 4,135,083. In such optical reading apparatus there is no tracking mirror. Rather, focusing and tracking corrections are effected by moving the objective lens in both the direction of the optical axis (for focusing) and a direction perpendicular to the optical axis (for tracking). In this apparatus, however, the mass of the movable member which includes the objective lens is relatively large. Thus, in order for the movable member to have the proper kinetic characteristics for responding to tracking and focusing error signals, it is necessary for either the driving current or the number of coil turns in its associated electromagnetic driving means to be relatively large.

OBJECTS AND SUMMARY OF THE INVENTION

Accordingly, it is an object of the present invention to provide an optical reading apparatus in which the above described problems associated with the prior art are avoided.

More specifically, it is an object of this invention to provide an optical reading apparatus with a device of relatively small size which supports an objective lens for movements in two perpendicular directions for correcting errors, for example, in focusing and tracking, with high accuracy.

In accordance with an aspect of the invention, an optical reading apparatus is provided with fixed and movable support members, first resilient connecting members flexible substantially only in a first direction and mounting the movable support member on the fixed support member for movements relative to the latter in such first direction, second resilient connecting members flexible substantially only in a second direction at right angles to the first direction, and an objective lens assembly mounted by the second connecting members on the movable support member for movements relative to the fixed support member in said first and second directions.

The above, and other objects, features, and advantages of the present invention, will become apparent from the following detailed description of an illustrative embodiment which is to be read in conjunction with the accompanying drawings, in which like reference numerals designate like elements and parts.

DESCRIPTION OF A PREFERRED EMBODIMENT

Figure 1:
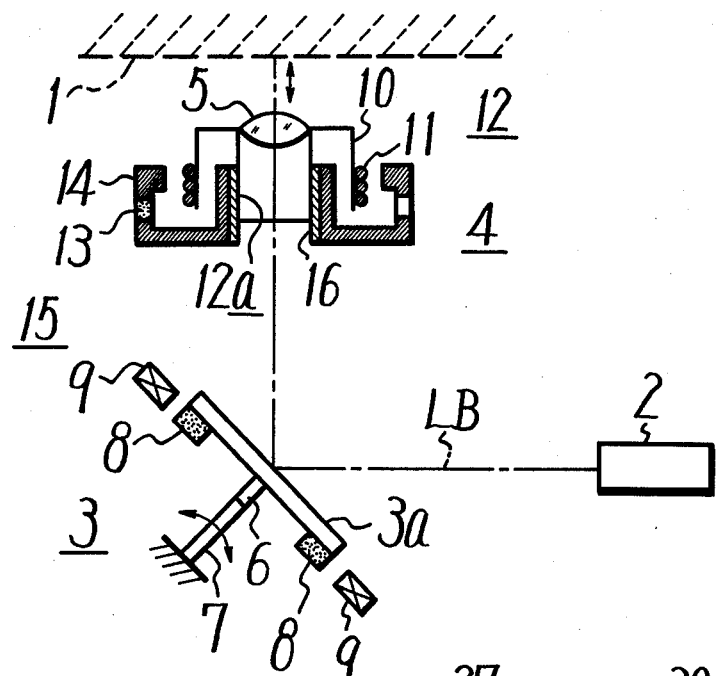
FIG. 1 is a schematic elevational view showing the earlier described prior art optical reading apparatus.
Figure 2:
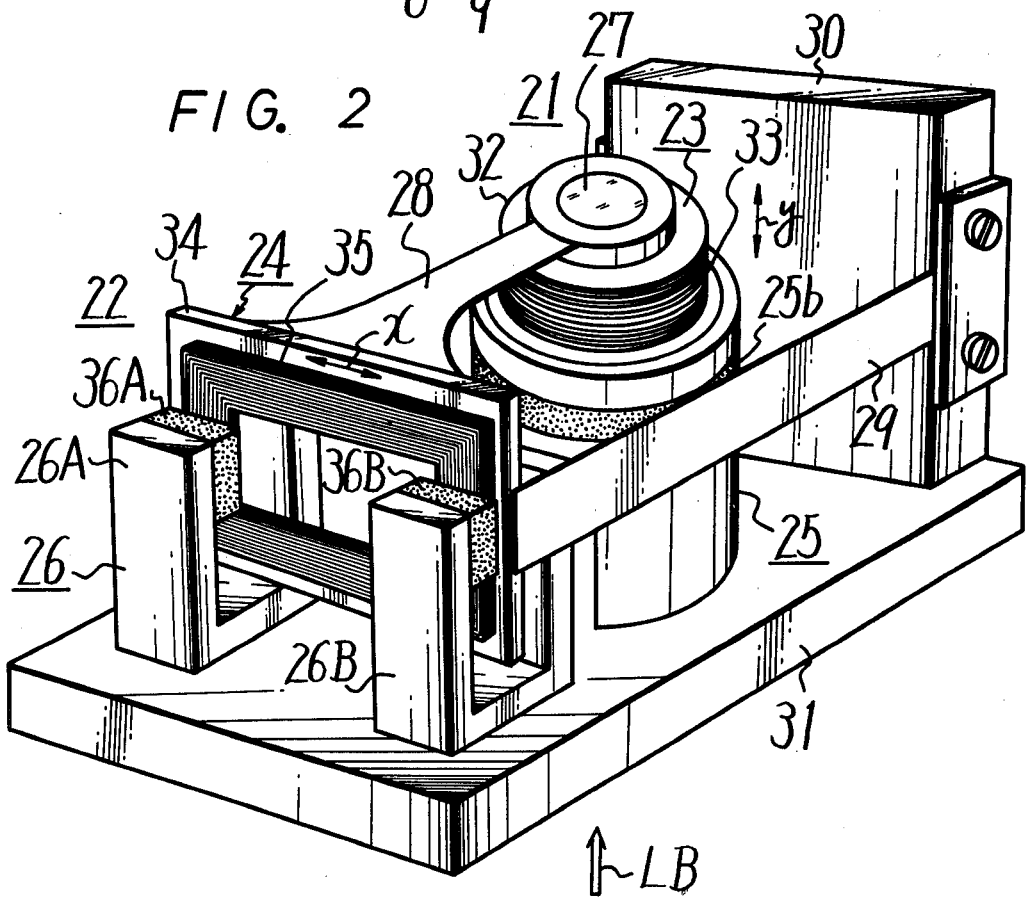
FIG. 2 is a perspective view of an embodiment of an optical reading apparatus according to the present invention.
Figure 3:
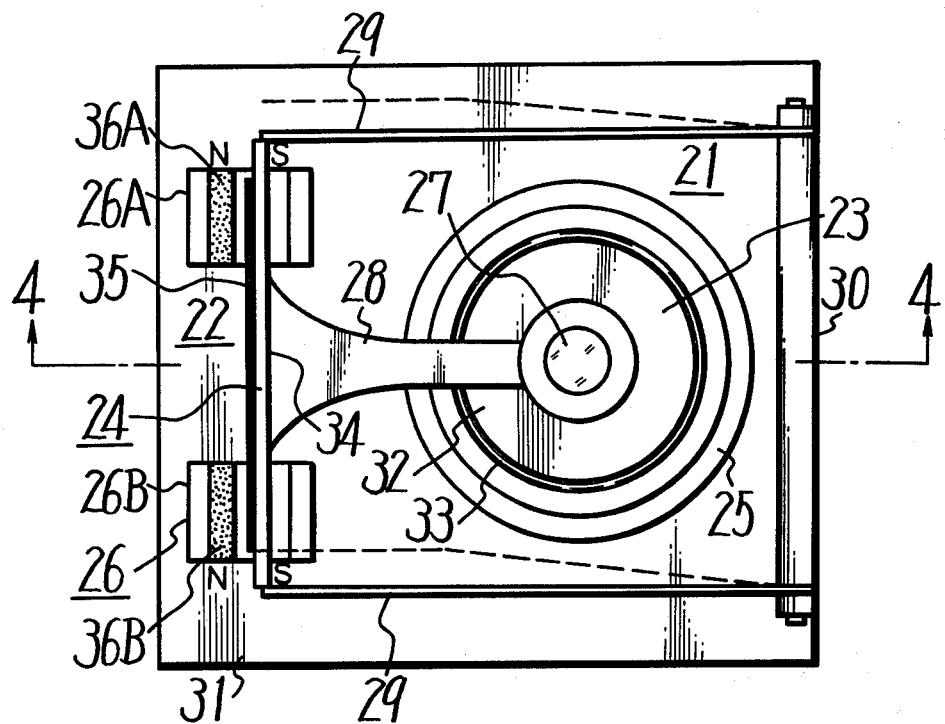
FIG. 3 is a top plan view of the apparatus shown on FIG. 2.
Figure 4:
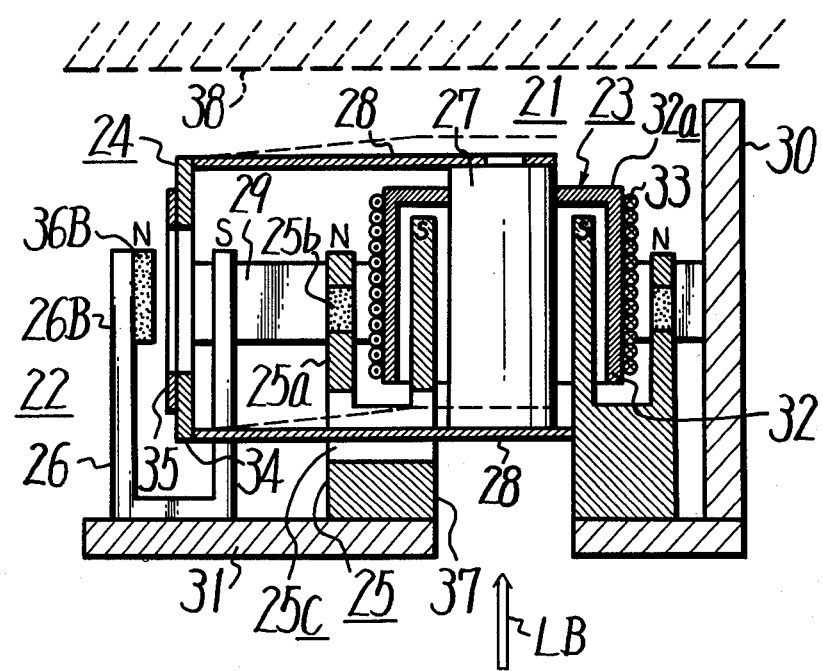
FIG. 4 is a sectional view taken along the lines 4—4 on FIG. 3.

Referring in detail to FIGS. 2, 3 and 4, it will be seen that optical reading apparatus embodying this invention has a fixed support member which, in the illustrated embodiment, includes a base 31, and a vertical portion 30 attached to the base near one end thereof. A first pair of resilient connecting members 29, which may be, for example, a pair of parallel leaf springs, are mounted, at one end, on the vertical portion 30 and project from the latter above and parallel to base 31. The faces of springs 29 are seen to be vertical and, therefore, springs 29 are flexible substantially only in the direction indicated by the double-headed arrow X on FIG. 2. Attached to the ends of first resilient connecting members 29 remote from vertical portion 30 is a movable support member 24 which, in this embodiment, is in the form of a flat rectangular frame 34. The first connecting members 29 are attached to frame 34 at the two opposed ends of the frame which is generally disposed in a vertical plane.

Attached to frame 34 at the other two sides thereof, that is, the upper and lower sides, are second resilient connecting members 28 which, in this embodiment, are shown to be also in the form of parallel leaf springs. The springs 28 are seen to be oriented with their faces generally parallel to base 31 and extending from movable support member 24 in a direction generally toward vertical support portion 30, so that they are flexible substantially only in the direction indicated by the double-headed arrow Y on FIG. 2. The direction "Y" is seen to be generally vertical with respect to base 31, whereas the direction "X" is seen to be generally horizontal.

Attached between the free ends of the second resilient connecting members, that is, the ends of springs 28 which are remote from movable support member 24, is a cylindrical objective lens assembly 27.

The movable support member 24 forms the movable part of a first linear motor 22 which, in the illustrated embodiment, is of the moving-coil type, but the moving-magnet type of linear motor may also be used. The flat, rectangular frame 34 forming movable support member 24 may be made, for example, of steel plate, and a coil 35 is wound on one surface thereof. The movable member 24 is suspended by the first resilient connecting members 29 between the ends of two U-shaped yokes 26A and 26B, which together are included in a fixed member 26 of linear motor 22, and which extend upwardly from base 31 at the end away from the vertical portion 30. Attached to inside surfaces of yokes 26A and 26B are magnets 36A and 36B, respectively, which are disposed to form north and south magnetic poles at the opposite ends of each yoke. The support member 24 is mounted so that, under the influence of the electromagnetic force caused by a current flowing in coil 35 and coacting with the magnetic field produced by yokes 26A and 26B and magnets 36A and 36B, respectively, member 24 is moved into a biased position, for example, as shown by the broken lines in FIG. 3.

The ends of second resilient connecting members 28 which are directed toward vertical support portion 30 are connected, as discussed above, to the upper and lower ends of objective lens assembly 27. As a result of the orientation of members 28, assembly 27 is movable in the "Y" direction, for example, to the biased position shown in broken lines in FIG. 4. The lens assembly 27 is moved in the "Y" direction by a second linear motor 21. The second motor 21 comprises a cylindrical bobbin 32 concentric with the lens assembly 27 and attached thereto near the upper ends of the assembly 27 and bobbin 32 by an annular connecting portion 32a. A coil 33 is wound around the bobbin 32 to form with the latter a movable member 23.

The second motor 21 further comprises a fixed member 25 which includes a yoke 25a attached to base 31 generally beneath lens assembly 27. As shown in FIG. 4, yoke 25a is annular and, at its upper portion, the wall of yoke 25a is bifurcated to form inner and outer cylindrical portions and a gap therebetween. The outer cylindrical portion of yoke 25a has a ring-shaped magnet 25b interposed therein so as to provide north and south magnetic poles at the upper ends of the outer and inner cylindrical portions, respectively. Cylindrical bobbin 32 and coil 33 wound thereon are suspended in the gap between the inner and outer upper cylindrical portions of yoke 25a, by virtue of the attachment of bobbin 32 to lens assembly 27 which, in turn, is suspended between second resilient connecting members 28. A slot 25c is provided in yoke 25a to permit the lower member 28 to extend between the lower end of assembly 27 and the lower end of movable support member 24.

As shown in FIG. 4, a laser beam LB is directed through an aperture 37 in base 31 and yoke 25a into lens assembly 27. After passing through the lens assembly, beam LB impinges against an optical recording medium surface 38 at a selected location to be scanned. The first resilient connecting members 29 and linear motor 22 are operative to move lens assembly 27 in a direction parallel to surface 38 at said scanned location, that is, in the "X" direction on FIG. 2. The second resilient connecting members 28 and linear motor 21, on the other hand, are operative to move lens assembly 27 in the "Y" direction on FIG. 2, that is, in a direction normal to surface 38 at the scanned location.

In operation, a tracking error signal is suitably applied to coil 35 for causing the first linear motor 22 to exert an electromagnetic force which moves movable support member 24 and connecting members 29 in the "X" direction, as shown by the broken lines in FIG. 3. As shown in FIG. 4, the "X" direction is parallel to record medium surface 38 at the scanned location. If this direction "X" is also transverse to the direction along a track in which information is recorded, the function of this movement can be to correct tracking errors. Alternatively, if the direction "X" is parallel to the track at the scanned location, the motion in the direction "X" can correct time-base errors. It also will be appreciated that the correcting motion of the device parallel to a record medium surface can be used when the record medium surface is on a cylinder or drum, as well as when the record medium surface is flat, for example, on a record disc.

A focusing error signal is suitably provided to coil 33, and a resulting electromagnetic force in the second linear motor 21 moves lens assembly 27 and connecting members 28 in the "Y" direction, as shown by the broken lines in FIG. 4. Since the direction "Y" is normal to surface 38 at the scanned location, the movement in the direction "Y" serves, for example, to correct focusing errors.

In the above described illustrative embodiment of the present invention, a body, such as, the objective lens assembly 27 in an optical reading apparatus, can be moved accurately by a simple electromechanical mounting device along at least two perpendicular or orthogonally relates axes, with less deterioration over time and hysteresis characteristics than in prior devices. Further, the mounting device is lighter, smaller, and more compact than devices previously provided for similar purposes.

A further noteworthy feature is that the lens assembly 27 achieves positive tracking, or other motion parallel to a record medium surface, in response to motion of the movable support member 24 of first linear motor 22. This feature is accomplished by recognizing that the second pair of leaf springs 28 have an appropriate width in the "X" direction so as to be substantially rigid in that direction. The surprising result is that, in the disclosed embodiment, positive control over the motion of the lens assembly 27 can be achieved, even though it is supported by flexible leaf springs 28 from another body, namely member 24, which is also supported by flexible leaf springs 29 whose independent motion partially determines the motion of the lens assembly.

Although the invention has been specifically described above in its application to an optical reading apparatus, it will be apparent that significant features of the invention have broader application to other apparatus in which it is desired to movably support a body for movements in orthogonally related directions. Further, although a particular embodiment of the invention has been described in detail with reference to the accompanying drawings, it is to be understood that the invention is not limited to that precise embodiment, and that various modifications and variations can be effected therein by one skilled in the art without departing from the spirit and scope of the invention as defined by the appended claims.

What is claimed is:

1. In an optical reading apparatus, the combination of:
   a fixed support member;
   a first pair of parallel, spaced apart leaf springs fixed at one ends thereof to said fixed support member and each having two opposed faces so as to be flexible substantially only in a first direction perpendicular to said faces of the first pair of leaf springs;
   a movable support member extending between and connected to other ends of said leaf springs for movements relative to said fixed support member in said first direction;
   a second pair of parallel, spaced apart leaf springs fixed at one ends thereof to said movable support member and extending from the latter generally parallel to said first pair of leaf springs in the direction toward said one ends of the latter, each of said second pair of leaf springs having two opposed faces which are oriented perpendicularly to said faces of said first pair of leaf springs so as to be flexible substantially only in a second direction at right angles to said first direction; and
   objective lens means located intermediate said first pair of leaf springs and being mounted between other ends of said second pair of leaf springs for movements relative to said fixed support member in said first and second directions.

2. An optical reading apparatus as in claim 1; further comprising first and second electromagnetic means associated with said movable support member and said objective lens means, respectively, and operative to move said objective lens means in said first and second directions, respectively, relative to said fixed support member.

3. An apparatus for optically reading information recorded in a track on a record medium surface, comprising the combination of:
   objective lens means for directing and focusing a light beam at a scanned location on said track;
   a fixed support member;
   a first pair of parallel, spaced apart leaf springs fixed at one ends thereof to said fixed support member and each having two opposed faces so as to be flexible substantially only in a first direction substantially parallel to said record medium surface at said scanned location;
   a movable support member extending between and connected to other ends of said leaf springs for movements relative to said fixed support member in said first direction;
   a second pair of parallel, spaced apart leaf springs fixed at one ends thereof to said movable support member and extending therefrom generally parallel to said first pair of leaf springs in the direction toward said one ends of the latter, each of said second pair of leaf springs having two opposed faces which are oriented perpendicularly to the faces of said first pair of leaf springs so as to be flexible substantially only in a second direction normal to said record medium surface at said location; and
   said objective lens means being located intermediate said first pair of leaf springs and being mounted between other ends of said second pair of leaf springs for permitting correcting movements of said objective lens means in said first and second directions relative to said track on the record medium surface.

4. An apparatus as in claim 3; wherein said first direction is transverse in respect to said track at said scanned location so that said correcting movements in said first and second directions can correct for tracking and focusing errors, respectively.

5. An apparatus as in claim 4; further comprising first and second electromagnetic means associated with said movable support member and said objective lens means, respectively, and operative to move said objective lens means in said first and second directions, respectively, relative to said fixed support member.

6. An apparatus as in claim 5; wherein
   said first electromagnetic means includes first coil means for receiving a first error signal and secured to one of said movable and fixed support members, and a first magnet secured to the other of said movable and fixed support members, said first magnet cooperating with said first coil means to cause movement of said objective lens means in said first direction in response to said first error signal; and
   said second electromagnetic means includes second coil means for receiving a second error signal and secured to one of said objective lens means and said fixed support member, and a second magnet secured to the other of said objective lens means and said fixed support member, said second magnet cooperating with said second coil means to cause movement of said objective lens means in said second direction in response to said second error signal.

* * * * *